United States Patent
Thieme et al.

(10) Patent No.: US 6,572,196 B1
(45) Date of Patent: Jun. 3, 2003

(54) STRUCTURAL PART CONNECTION BETWEEN TWO STRUCTURAL PARTS OF A CAR SEAT

(75) Inventors: Hans-Joachim Thieme, Magdeburg (DE); Werner Fahlbusch, Lüdersfeld (DE)

(73) Assignee: Faurecia Autositze GmbH & Co., KG, Stadthagen (DE)

( * ) Notice: Subject to any disclaimer, the term of this patent is extended or adjusted under 35 U.S.C. 154(b) by 24 days.

(21) Appl. No.: 09/784,023

(22) Filed: Feb. 16, 2001

(30) Foreign Application Priority Data

Feb. 23, 2000 (DE) .......................................... 100 08 204

(51) Int. Cl.⁷ ................................................ A47C 7/02
(52) U.S. Cl. .................................. 297/452.18; 297/362
(58) Field of Search .................... 297/463.1, 463.2, 297/452.18, 361.1, 362; 403/204, 381, 270, 271, 272, 274, 278, 280, 375

(56) References Cited

U.S. PATENT DOCUMENTS

| | | | |
|---|---|---|---|
| 2,321,755 A | * | 6/1943 | Kost |
| 3,095,951 A | * | 7/1963 | Rood et al. |
| 3,575,448 A | * | 4/1971 | Licari |
| 4,188,140 A | * | 2/1980 | Clemens et al. |
| 4,233,726 A | * | 11/1980 | Williams |
| 4,496,052 A | * | 1/1985 | Nertman |
| 5,888,015 A | * | 3/1999 | Brown et al. |

FOREIGN PATENT DOCUMENTS

DE          43 39 508 A1      5/1994

* cited by examiner

Primary Examiner—Milton Nelson, Jr.
(74) Attorney, Agent, or Firm—Connolly Bove Lodge & Hutz LLP

(57) ABSTRACT

The device relates to a structural part connection between two parts of a car seat, specifically a part of a car seat which is attached to a frame and a fixture part of an inclination adjusting fixture, wherein a first part is deployed with its front surface adjacent to a planar opposite surface of a second part. The first part is provided with a receiving through-opening which is formed at least up to the one of its front surface deployed opposite a rear side surface, and the second part supports at least a projecting part protruding from it, which is engaged in this receiving opening. The parts are welded to each other on the periphery of the projecting part and receiving opening. The diameter of the projecting part is enlarged in the direction toward the rear side surface. The parts are connected to each other in addition to welding also by positive locking, wherein the diameter enlargement is the result of a deformation the material or of the compression of the projecting part.

8 Claims, 3 Drawing Sheets

STRUCTURAL PART CONNECTION BETWEEN TWO STRUCTURAL PARTS OF A CAR SEAT

FIELD OF THE INVENTION

The invention relates to a structural part connection between two parts, specifically a part of a car seat, which is attached to a frame, and a fixture part of an inclination-adjusting fixture.

BACKGROUND OF THE INVENTION

According to a structural part connection known from prior art (DE 43 39 508 A1), a flat, conical projection of a first structural part is pressed during the welding procedure into a receiving opening of a second structural part. Due to the increased electric resistance between the edge of the receiving aperture and the projection, the edge will be substantially melted away so that the projection can sink into the receiving opening. The connection has the advantage that only small heat amounts will be applied to the participating structural parts so that the structural parts will not be warped. At the same time, the melted region is relatively small and the quality of the welding connection depends on allowable form deviations and the quality of the material. The welding connection is therefore not unobjectionable in all cases.

SUMMARY OF THE INVENTION

Based on this status of technology, the task of this invention is to provide a welded structural part connection, which is formed on the basis of known prior art, in such a way that the quality of the structural part connection is improved.

The solution of this task is accomplished in accordance with the characteristics disclosed in patent claim 1.

The weld seam connection is considerably reinforced by an additional positive locking (form fitting) connection. The reinforcement is achieved without a significant additional cost. The construction of the seam connection and of the positive locking connection can be created at the same time.

Preferred embodiments of the invention will become clear from the subordinated claims.

BRIEF DESCRIPTION OF THE DRAWINGS

The following is a detailed description of five embodiment forms of the invention which are based on the enclosed figures. The figures show:

FIG. 2a—a cross-sectional view showing the structural part region with a receiving opening according to a second embodiment form;

FIG. 2b—a cross-sectional view showing the structural part region with a receiving opening according to a third embodiment form;

FIG. 2c—a cross-sectional view showing a structural part region with a receiving opening according to a fourth embodiment form;

FIG. 2d—a cross-sectional view showing a structural part region with a receiving opening according to a fifth embodiment form;

FIG. 2e—a cross-sectional view of a receiving opening of a structural part region with an inserted projecting part; and FIG. 2f—a part of the region indicated in FIG. 2 shown with the projecting part after this part has been riveted.

DETAILED DESCRIPTION OF THE INVENTION

Figure 1:
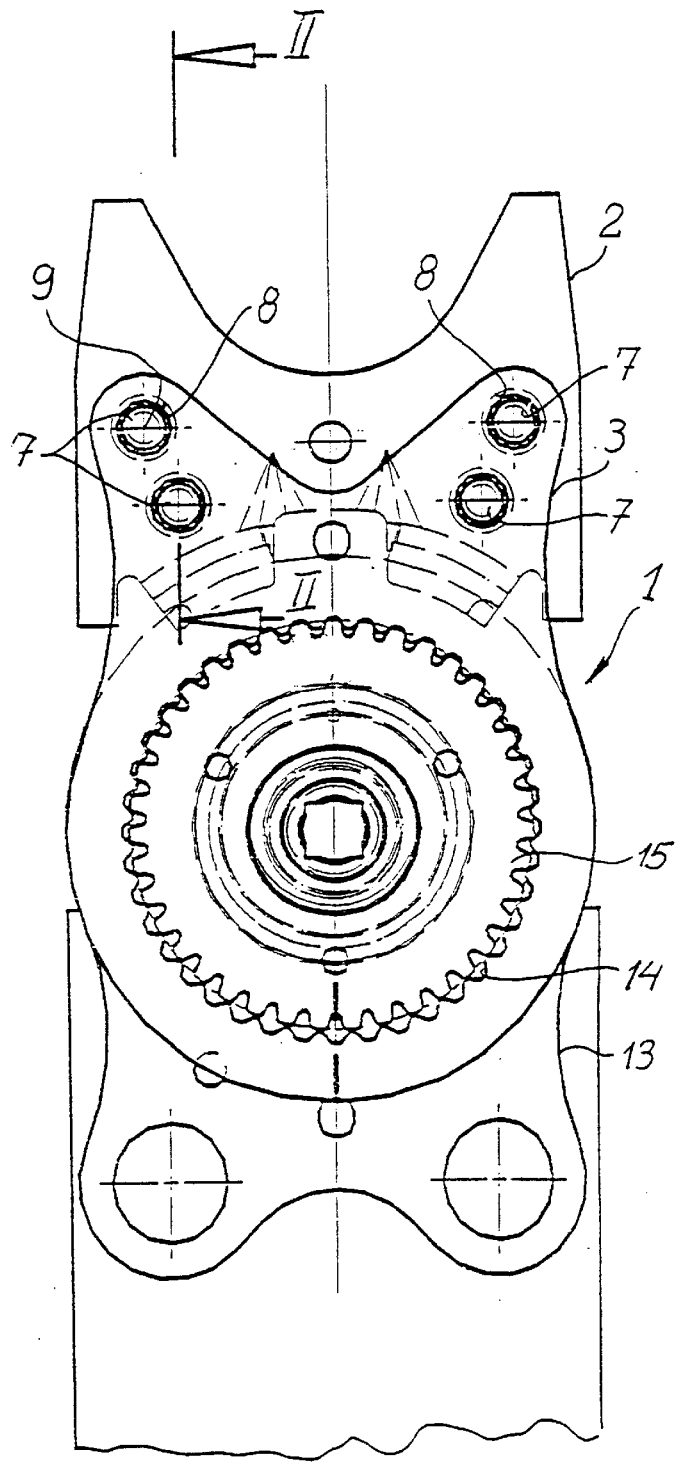
FIG. 1—a front view of an inclination adjusting metal fixture.

The inclination-adjusting fixture 1 depicted in FIG. 1 of a car seat, not indicated in the figure, is provided with a first part 3, formed as an upper fixture part and connected with a second part 2, which is formed as an adapter plate. The second part 2 overlaps lower fixture part 13 in one edge region. The upper fixture part 3 and the lower fixture part 13 are equipped with gear tooth systems 14 and 15, mutually engaged in a known manner, of an inclination adjusting fixture which is constructed as a swash plate drive.

The first part 3, which is welded to the second part 2, lies with its plane front surface 4 on the opposite surface 6 of the plate-shaped second part 2. The second part 2 is provided with projecting parts 7 which are protruding from this part. The projecting parts 7 are pressed into the receiving openings 8 passing through the first part 3. The projecting parts penetrate through these receiving openings 8.

In a first embodiment, the receiving opening 8 is provided with a first diameter region 10 and a second diameter region 11. The second diameter region 11 is adjacent to a rear side surface 5. To this second diameter region 11 is connected the first diameter region 10, which is conically extended toward front surface 4. The diameter regions 10 and 11 are arranged concentrically with respect to a central axis 9.

Because the projecting part 7 is provided with an almost conical outer circumference, a contact will be achieved between the projecting part 7 and the receiving opening 8 in the non-welded original status when both parts 2 and 3 are joined together for instance at the edge, which is formed by the front surfaces 4 and the adjoining diameter region 10. This diameter region 10 can be provided with a different profile pattern, as one can see from the drawings shown in FIG. 2a through 2e. In the embodiment form according to FIG. 2a, the first contact between projecting part 7 and receiving opening 8 occurs in the non-welded original status when parts 2 and 3 are joined together at the transition between the front surface 4 and the adjoining diameter region 10, which is formed with a slightly conical shape.

Other first contacts are also possible, for example in the transitional regions of both diameter regions 10 and 11.

The consequent welding procedure produces a concentrated current flow in the contact region resulting in welding. The projecting part 7 which is to be pushed through receiving opening 8 will be pressed against a spherical counter-tool when both structural parts are pressed together.

Figure 2:
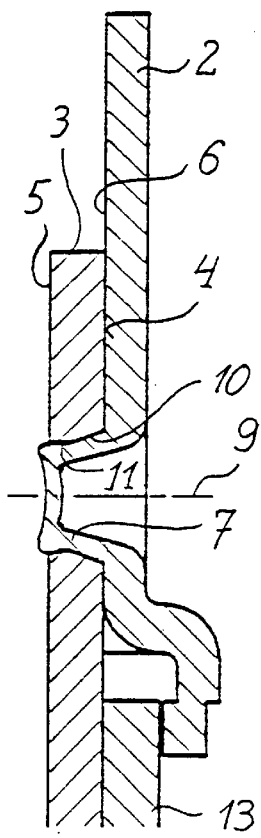
FIG. 2—an enlarged cross-sectional view of a structural part connection having a receiving opening according to a first embodiment form indicated along the cutting plane II—II in FIG. 1.
Figures 2A, 2B, 2C, 2D:
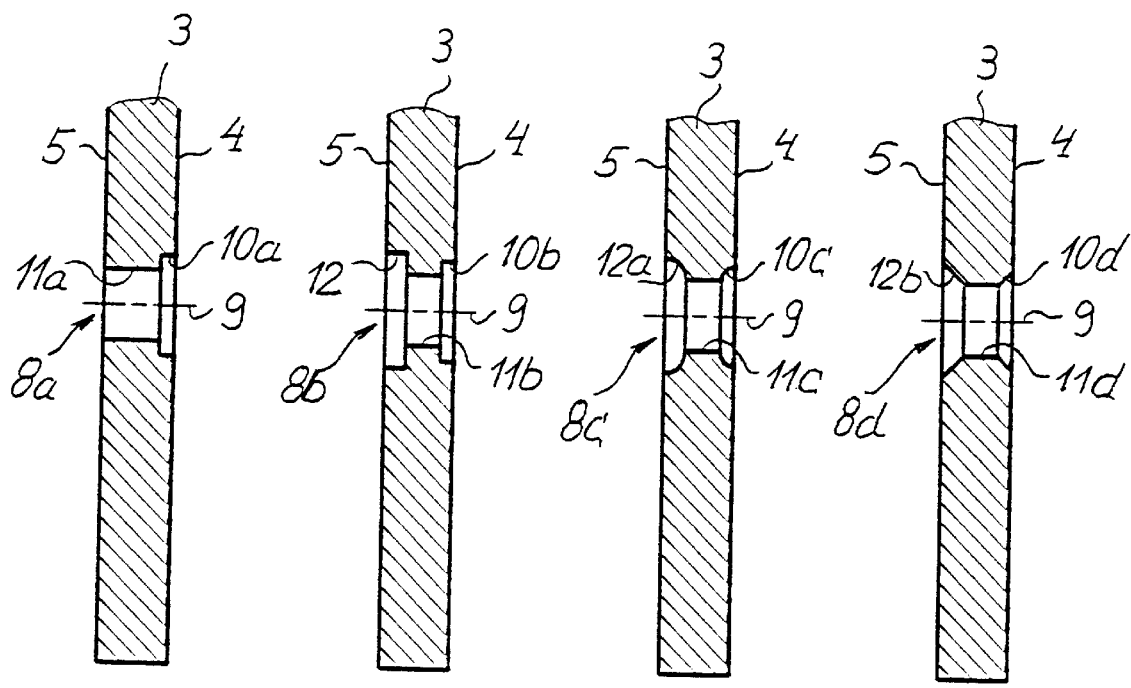
Figure 2E:
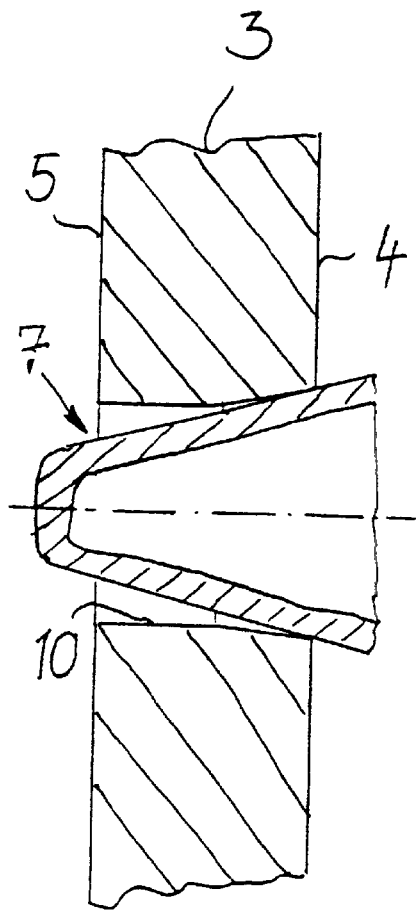
Figure 2F:
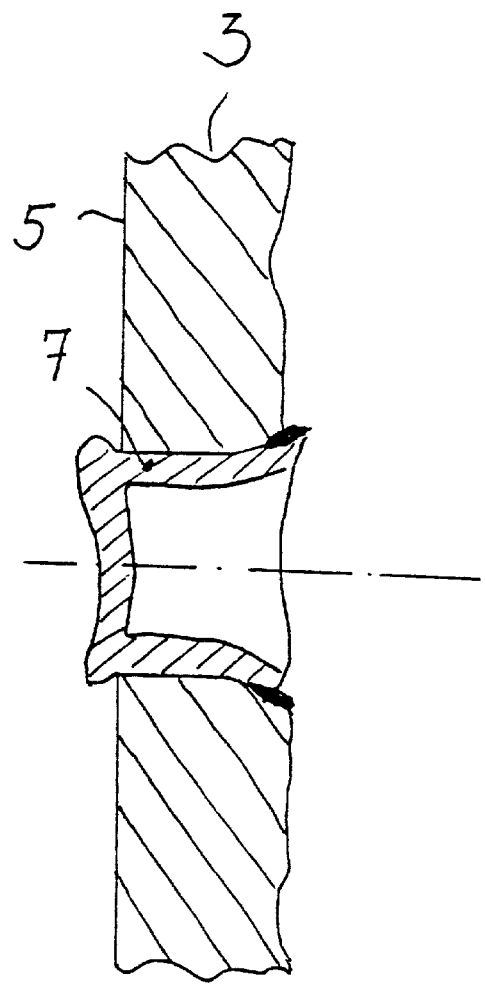

This counter-pressure leads to a change of shape of the projecting part 7, as can be more clearly seen in FIGS. 2 and 2f. In the final deformed status of the projecting part 7, radially extended overhangs of the fixture part 3 will be produced on the rear side surface 5. In addition to the above described weld connection, a seam connection is thus created in this manner also between parts 2 and 3.

Other embodiment forms of the structural part connection differ from the above-described embodiments only by the shape of the receiving openings. In the embodiment form depicted in FIG. 2a, the receiving opening 8a is formed with two circular, cylindrical diameter regions 10a and 11a. The first diameter region 10a adjoining front surface 4 is provided with a larger diameter than the second diameter region 11a. This results in exact positioning, which occurs when the welding seam is created, during pressure welding on the edge of diameter regions 10a and 11a, which have a different diameter.

In the embodiment form depicted in FIG. 2b, another diameter, diameter 12, bordering on the rear side surface 5, is adjacent to a second diameter region 11b of receiving opening 8b, which has an even larger diameter when compared to the first diameter region 10b. This diameter region 12 contains the radially expanded part of the projecting part 7. Because of that, projecting part 7 will not be protruding in front of the rear side surface 5 and the positive locking (form fitting) between the parts 3 and 2 is thus improved.

Also in this embodiment form, the positive locking created between parts 3 and 2 results in an additional seam connection.

The embodiment form shown in FIG. 2c is provided with a receiving opening 8c having dome-shaped diameter regions 10c and 12a, which are enlarged next to a circular, cylindrical central diameter region 11c toward front surface 4 or rear side surface 5. The enlarged diameter regions 10c and 12a can be formed in the direction of central axis 9 also with other profiles. FIG. 2d shows conically enlarged diameter regions 10d and 12b of the receiving opening 8d. The conical shapes next to central diameter region 11d are enlarged in the direction toward the front surface 4 or the rear side surface 5. All the diameter regions 10d, 11d and 12b are deployed concentrically to the central axis 9.

What is claimed is:

1. A structural part connection between two parts, specifically a part of a car seat which is attached to a frame and a fixture part of an inclination adjusting fixture (1), wherein a first part (3) with front surface (4) in contact with an opposite surface (6) of a second part (2), wherein the first part (3) is provided with a receiving through-opening extending from a front surface (4) to an opposite rear side surface (5), and the second part (2) is provided a projecting part (7) engaged in the receiving opening as the first part and second part are welded to each other on the periphery of the projecting part (7) and the receiving opening, wherein a diameter of the projecting part (7) is enlarged in the direction toward the rear side surface (5), the first part and the second part connected to each other in addition to welding also by positive locking, and the diameter enlargement results from a deformation of material of the projecting part (7) extending beyond the rear side surface.

2. The structural part connection according to claim 1, wherein a region of the receiving opening is constructed with a circular and cylindrical form and the projecting part (7) is shaped at least essentially in a tapered conical form.

3. The structural part connection according to claim 2, wherein the receiving opening is provided with different diameter regions, including a first diameter region with a first diameter extended next to the front surface (4), the first diameter region adjacent to a second diameter region with a second, smaller diameter.

4. The structural part connection according to claim 3, characterized by the fact that another diameter region, having an enlarged diameter which is bordering on the rear side surface (5), is adjacent to the second diameter region of the receiving opening in the direction of the rear side surface (5).

5. The structural part connection according to claim 4, wherein the first and the second diameter regions are in alignment with each other.

6. The structural part connection according to claim 4, wherein a diameter (12) bordering on the rear side surface (5) is formed with a circular, cylindrical shape.

7. The structural part connection according to claim 3, further comprising a central diameter region disposed between the first and the second diameter regions.

8. The structural part connection according to claim 3, wherein the peripheral surfaces of receiving opening are extended from a central diameter region towards the front surface (4) and/or rear surface (5) with a curved profile.

* * * * *